AUTOMOBILE LAMP ATTACHMENT.
APPLICATION FILED AUG. 11, 1913.
1,096,381.
Patented May 12, 1914.
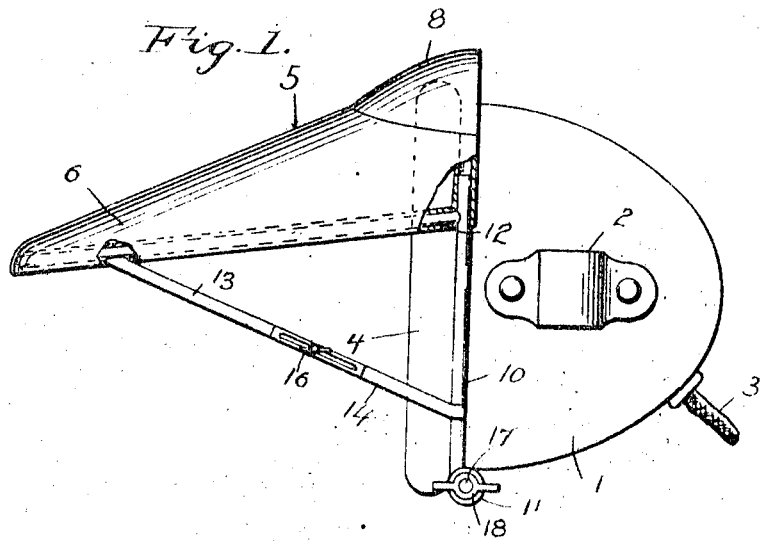
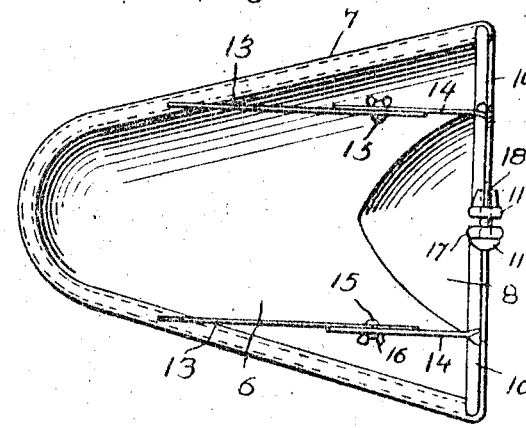
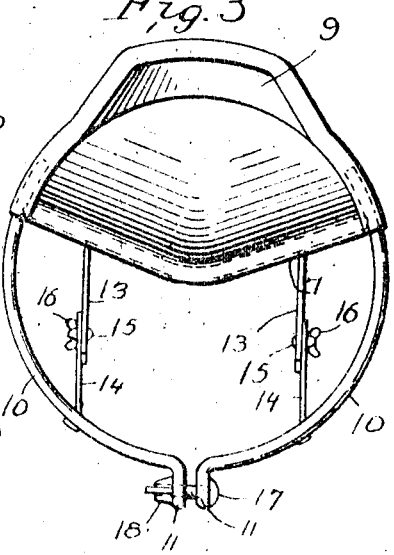
Witnesses
R. N. Jones
H. Kaye Martin
Inventor
G. Lokerse.
Attorney

UNITED STATES PATENT OFFICE.

GILBERT LOKERSE, OF KANAWHA, IOWA.

AUTOMOBILE LAMP ATTACHMENT.

1,096,381. Specification of Letters Patent. Patented May 12, 1914.

Application filed August 11, 1913. Serial No. 784,245.

*To all whom it may concern:*

Be it known that I, GILBERT LOKERSE, a citizen of the United States, residing at Kanawha, in the county of Hancock and State of Iowa, have invented certain new and useful Improvements in Automobile Lamp Attachments; and I do hereby declare the following to be a full, clear, and exact description of the invention, such as will enable others skilled in the art to which it appertains to make and use the same.

This invention relates to attachments for automobile lamps and has for its object to provide a device which may be applied to lamps of the ordinary type without in any way changing the construction of such lamps.

Another object of my invention is to provide a device which will protect the eyes of a driver proceeding in the opposite direction.

Another object of my invention is to simplify the construction of such devices and render them effective under all conditions.

With the above and other objects in view I now proceed to describe my invention in the following specification and accompanying drawings, in which—

Figure 1 is a side view of an automobile lamp with my improved attachment applied thereto, Fig. 2 is a bottom plan view of my improved attachment, and Fig. 3 is a rear view of my improved attachment.

Referring to the drawings by characters of reference, 1 indicates the ordinary type of electric head light provided with the ear 2, by means of which it is secured to the frame of a machine. The usual source of light supply 3 is provided and a semi-circular bead 4 is shown at its usual position on such head lights.

My improved shade, indicated generally at 5, preferably comprises a metallic shield 6, which is shaped, as clearly illustrated in Fig. 2, and is provided along its edges with a bead 7. A slightly raised portion 8 is formed at the uppermost extremity of the shield 6 and is adapted to form an air space 9, as will be clearly seen in Fig. 3.

A wire frame work is provided comprising the segmental wires 10, which are provided at their lower extremities with the loops 11 and when said loops are in position these wires 10 form a substantially U-shaped member which is adapted to partially surround the lamp and be secured thereto. Secured adjacent the upper extremities of the wires 10 I provide the wires 12, which are secured within the beads 7, as will be clearly seen upon referring to Fig. 1. This wire 12 is preferably bent in the form of a U-shaped member, as will be clearly seen upon referring to Fig. 2, and its rear ends soldered, or otherwise secured to the wires 10. Adjacent the forward end of the U-shaped member I preferably secure the bars 13 which extend rearwardly and downwardly as clearly shown and coöperate with the bars 14 which are secured to the wires 10 intermediate their upper and lower extremities. These bars 13 and 14 are preferably provided with slots which are adapted to permit a bolt 15 having the wing nut 16, on the end thereof, to be passed through the bars and provide a means of adjustment therefor. Thus, it will be seen that the end of the U-shaped member may be adjusted with relation to the wires 10 and held in the adjusted position by means of the rods 13 and 14. A suitable bolt 17 is adapted to extend through the loops 11 formed at the lower extremities of the wires 10 and be securely held therein by means of the wing nut 18.

It will be seen from the foregoing that when it is desired to make use of my improved lamp attachment the wing nut 18 is removed from its position on the bolt 17. The said bolt is then withdrawn and it will be obvious that the segmental arms 10 may be spread and sprung over the bead 4 formed on the lamp 1. The bolt 17 is then replaced and the nut 18 tightened. It will be seen that accidental displacement of the attachment will be substantially eliminated. The arms 13 and 14 may then be adjusted with relation to each other in order to spring the shield to the desired position and it will be obvious upon tightening the bolts 15 that the said shield will remain in the desired position and be prevented from becoming displaced. When it is desired to remove the attachment from its position substantially the same process is gone through and I thus provide a shade which may be easily and quickly applied or removed from its position on the lamp.

While in the foregoing I have shown and described the preferred embodiment of my invention, I wish it to be understood that I may change the specific arrangement and combination of parts without in any wa departing from the spirit and scope of my invention as defined in the appended claim.

What I claim is:—

In combination with an automobile head light, a shield, beads formed at the edges of said shield, wires secured within the beads, supporting wires partially surrounding the head light, said supporting wires being secured to the aforesaid wires, a brace wire secured intermediate the ends of the first mentioned wire, said brace wire extending rearwardly and downwardly and adapted to be removably secured between the lowermost terminals of the supporting wires.

In testimony whereof I affix my signature in presence of two witnesses.

GILBERT LOKERSE.

Witnesses:
FRED N. KNUDSEN,
C. C. LUCAS.